United States Patent
Brink et al.

(10) Patent No.: US 7,310,451 B2
(45) Date of Patent: Dec. 18, 2007

(54) SUB-PIXEL IMAGE SHIFTING IN DISPLAY DEVICE

(75) Inventors: Peter C. Brink, Tempe, AZ (US); John W. Katausky, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 563 days.

(21) Appl. No.: 11/028,395

(22) Filed: Jan. 3, 2005

(65) Prior Publication Data

US 2006/0146041 A1  Jul. 6, 2006

(51) Int. Cl.
*G06K 9/03* (2006.01)
*H04N 3/26* (2006.01)
*G06K 9/32* (2006.01)

(52) U.S. Cl. ............ 382/300; 382/293; 348/745

(58) Field of Classification Search ........ 382/300, 382/299, 293, 294, 295, 291, 276; 345/606, 345/613, 204, 698; 348/744, 745, 747

See application file for complete search history.

(56) References Cited

U.S. PATENT DOCUMENTS

| 6,456,340 B1 * | 9/2002 | Margulis ............. 348/745 |
| 6,804,419 B1 * | 10/2004 | Miyake .............. 382/300 |
| 7,190,380 B2 * | 3/2007 | Damera-Venkata et al. ............. 345/698 |

* cited by examiner

*Primary Examiner*—Yon J. Couso
(74) *Attorney, Agent, or Firm*—Buckley, Maschoff & Talwalkar LLC

(57) ABSTRACT

A method includes providing a display device. The display device may include a plurality of picture elements and a plurality of pixel drivers each for driving a respective one of the picture elements. The method may further include receiving input image data to drive the picture elements to display an image in an image plane. The method may also include receiving user input to indicate a shift in position of the image in the image plane. The shift in position may be by less than the distance between adjacent picture elements. In response to the user input, the input image data may be processed to generate interpolated image data to implement the shift in position. The picture elements may be driven with the interpolated image data.

18 Claims, 6 Drawing Sheets

SUB-PIXEL IMAGE SHIFTING IN DISPLAY DEVICE

BACKGROUND

Display apparatuses have been proposed of types that are suitable for digital control and for manufacture by techniques used for manufacturing micro-electronic devices. Among these types of display apparatuses are those based on liquid-crystal-on-silicon (LCOS) devices or digital light processor (DLP) devices. It has also been proposed to couple such devices to an image projection apparatus to produce a large-screen display.

One shortcoming of display apparatuses of the types just described is that the apparatuses do not include a mechanism for adjusting the location of the displayed image by a sub-pixel amount, i.e. by an amount that is less than the distance between adjacent pixels.

DETAILED DESCRIPTION

Figure 1:
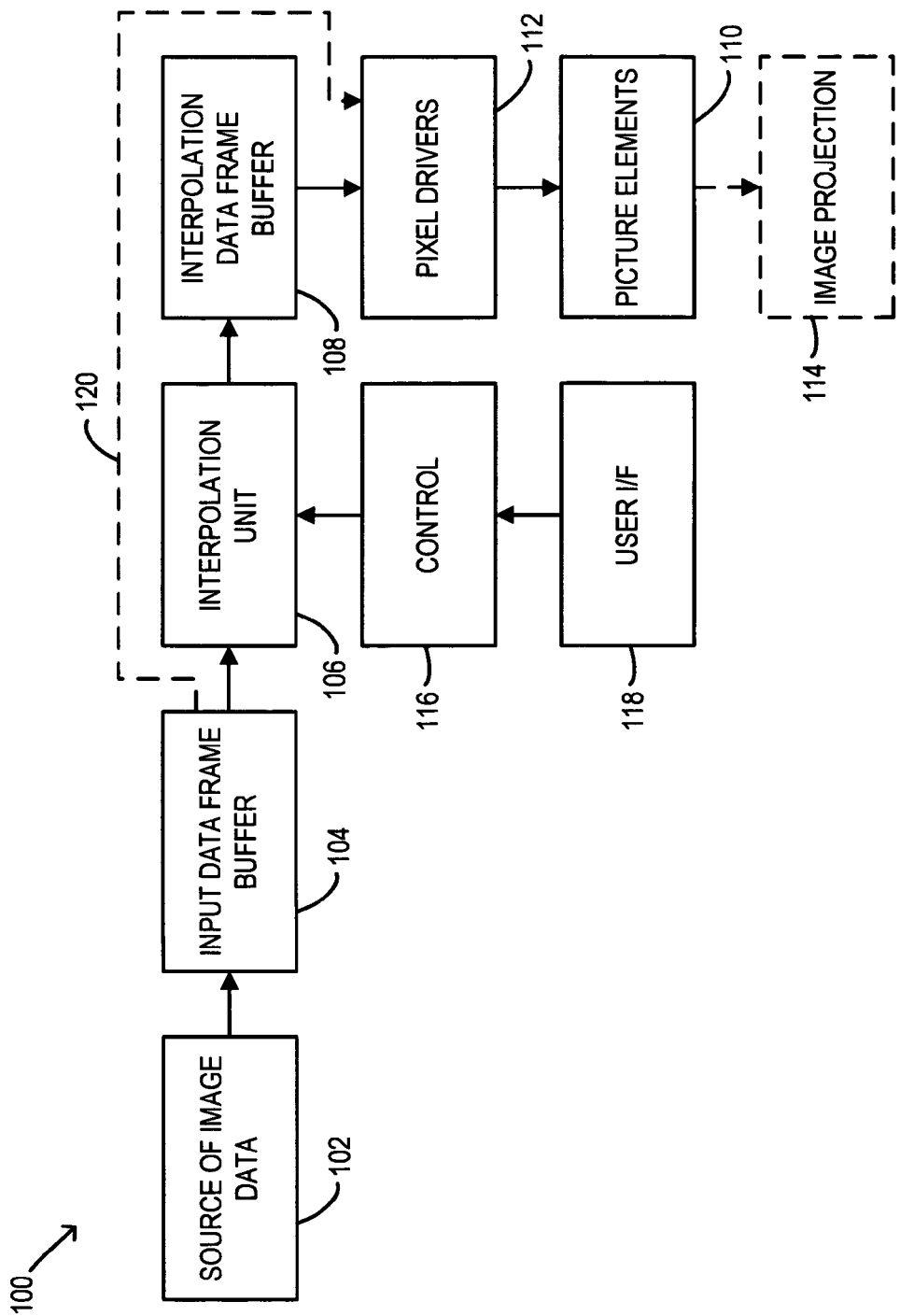
FIG. 1 is a block diagram of a display apparatus provided in accordance with some embodiments.

FIG. 1 is a block diagram of a display apparatus 100 provided in accordance with some embodiments.

The display apparatus 100 includes a source 102 of image data. The image data source 102 may, for example, include a television tuner, set top box or digital television satellite receiver and may include if needed suitable circuitry for converting the received television signal into digital image data. In addition or alternatively, the image data source may include a disk drive (e.g., a hard disk drive or a DVD drive) to reproduce image data from a mass storage medium. In addition or alternatively, the image data source 102 may include a digital video camera.

The display apparatus 100 also may include an input data frame buffer 104 that is coupled to the image data source 102 to temporarily store one or more frames of input image data. The display apparatus 100 further may include an interpolation unit 106 that is coupled to the input data frame buffer 104. As described further below, the interpolation unit 106 may operate to process the input image data stored in the input image data stored in the input data frame buffer 104 to generate interpolated image data to allow for repositioning of the image in an image plane. In addition, the display apparatus 100 may include an interpolation data frame buffer 108 to temporarily store the interpolated image data generated by the interpolation unit 106.

Still further, the display apparatus 100 may include a two-dimensional array (indicated by block 110) of picture elements such as LCOS or DLP picture elements which define an image plane (not separately shown in FIG. 1). Also, the display apparatus 100 may include a plurality of pixel drivers, which are represented by block 112. Each of the pixel drivers 112 may be coupled to a respective one of the picture elements 110 and also to the interpolation data frame buffer 108. Each pixel driver 112 may operate in accordance with a respective pixel value included in the interpolated image data stored in the buffer 108 to drive its respective picture element 110 in accordance with the respective pixel value so that an image is displayed in the image plane defined by the picture elements 110. In addition or alternatively, the display apparatus 100 may include an image projector 114 (shown in phantom) that is coupled to the picture element array 110 to project the image represented by the interpolated image data (and reproduced by the picture elements 110) in an image plane on a display screen (not separately shown).

In addition, the display apparatus may include a control circuit 116 which is coupled to the interpolation unit 106 and a user interface 118 coupled to the control circuit 116. The user interface 118 may include any one or more of a number of conventional user input devices (not separately shown), such as a keyboard and/or keypad, a touch screen or other display screen (such as the screen upon which images are projected by image projector 114), a remote control unit, a mouse or other cursor control device, etc. As will be seen, the user interface 118 may receive input from a user by which the user may indicate a desired shift in position in the image plane of the image displayed by or through operation of the picture elements 110. The shift in position of the image may correspond to a distance that is less than the distance between adjacent ones of the picture elements and thus may be a sub-pixel shift. The control circuit 116 may be responsive to the user interface 118 so as to control the interpolation unit 106 to cause the interpolation unit to generate the interpolated image data from the input image data in a manner that implements the user's desired shift in the image's position.

Some operations of the display apparatus 100 will now be described with reference initially to FIG. 2.

Figure 2:
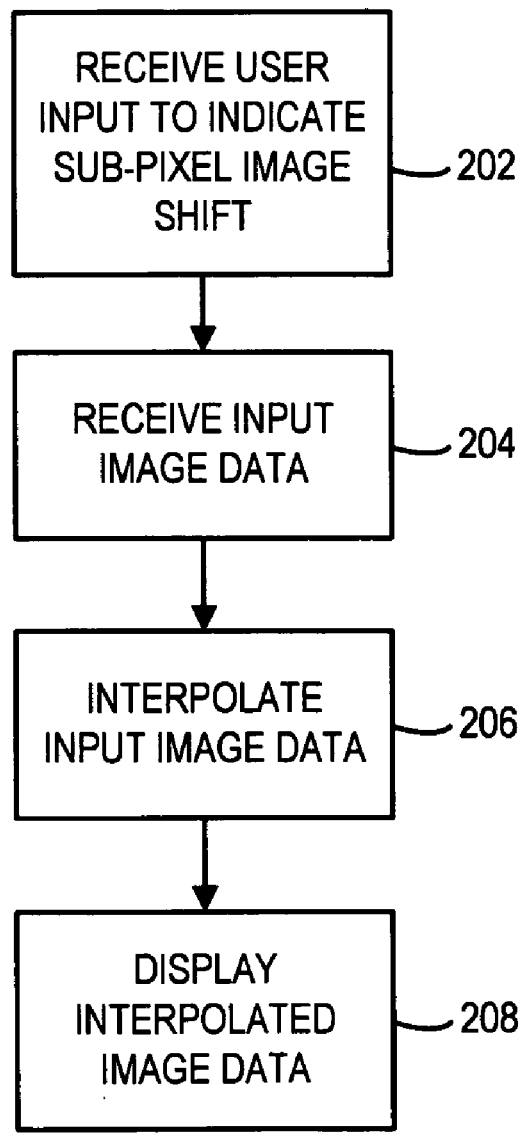
FIG. 2 is a flow chart that illustrates a process performed in the display apparatus of FIG. 1.
Figure 3:
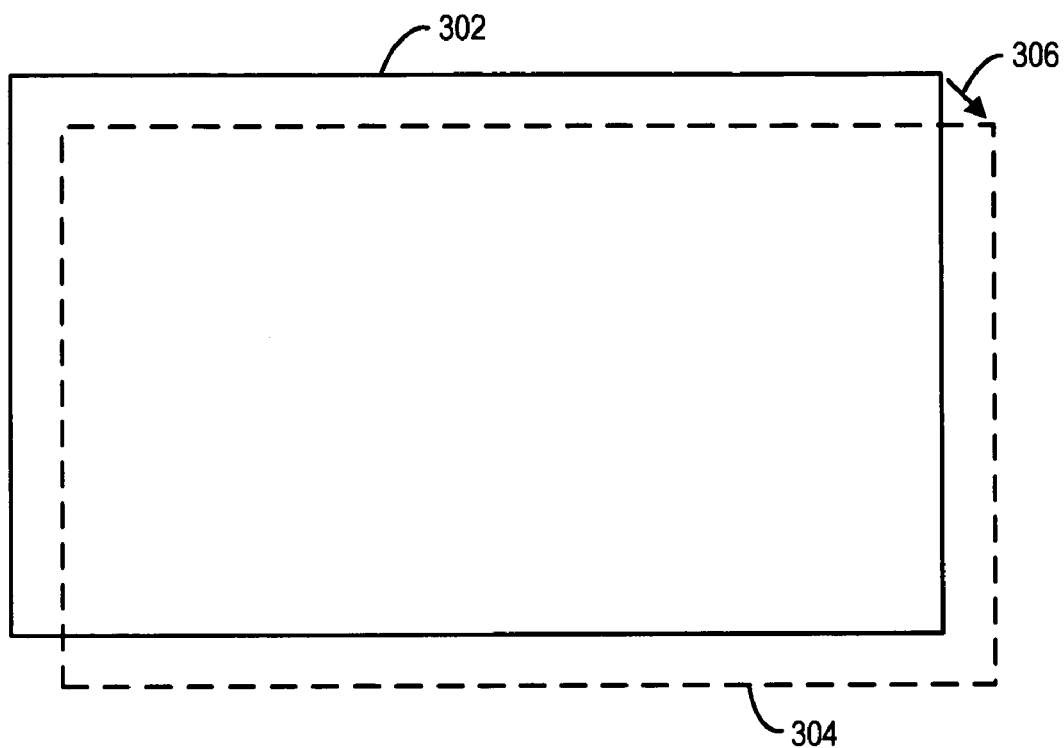
FIG. 3 schematically illustrates an operation performed with the display apparatus of FIG. 1 to shift the location of an image in an image plane.

At 202 in FIG. 2, the control circuit 116 receives user input via the user interface 118 to indicate a shift in position of the image desired by the user. On at least some occasions, the selected shift in position may be a sub-pixel shift in at least one of the horizontal direction and the vertical direction. FIG. 3 schematically illustrates such a shift in position. In FIG. 3, the solid line rectangle 302 represents the image plane which coincides with the fixed positions of the picture elements 110. The dashed-line rectangle 304 represents the position in the image plane to which the user desires that the image be shifted. The direction of shift is indicated by arrow mark 306 as, in this example, downward and to the right. (As shown in the drawing, the amount of the shift may be considered to be exaggerated or out of scale, inasmuch as the desired shift is assumed to be sub-pixel.)

Figure 4:
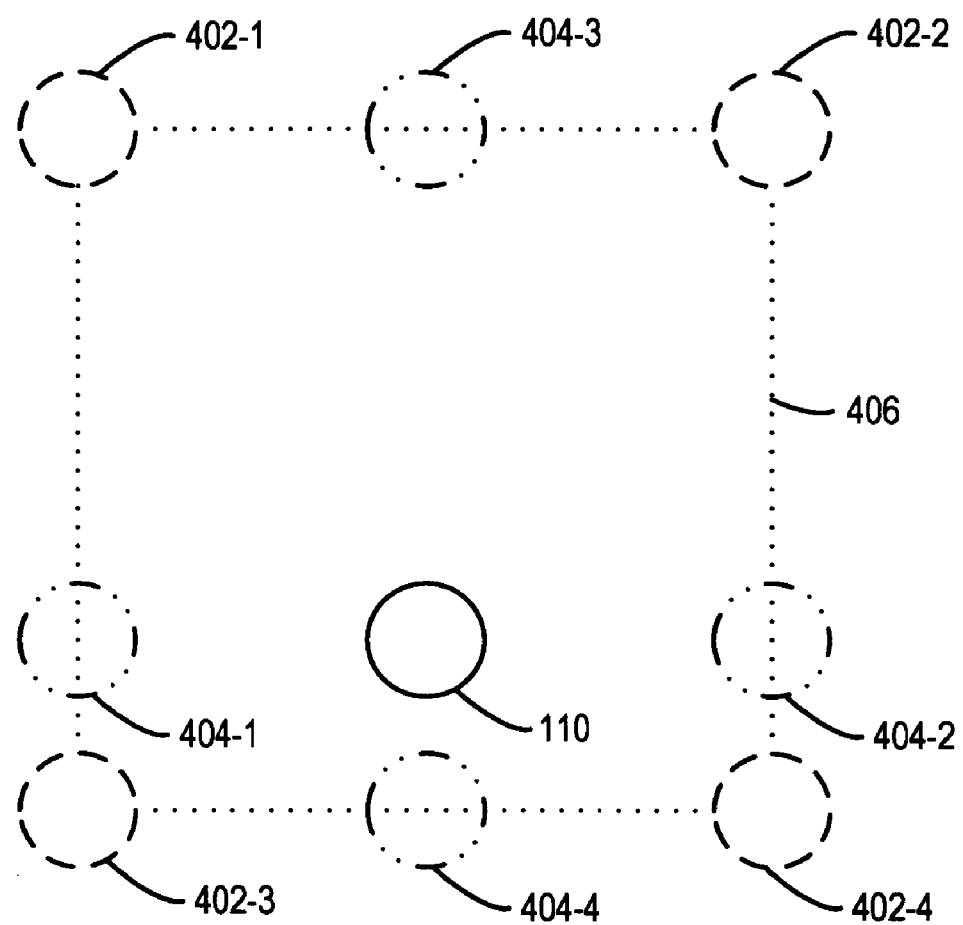
FIG. 4 schematically illustrates interpolation operations performed in the display apparatus of FIG. 1 to implement the image shift of FIG. 3.

Assuming a sub-pixel shift, the virtual pixel positions of the shifted image fail to correspond to the actual positions of the picture elements 110 in the image plane. Consequently, it may be necessary to interpolate the input image pixel values to generate the pixel values to be used to drive the picture elements 110 in order to implement the shift in image position. In particular, the locus of each actual picture element 110 will have four nearest neighbor virtual pixel locations which result from the shift in image position. FIG. 4 schematically illustrates this point. It is assumed for the purposes of FIG. 4 that the desired shift in position of the image is downward by one-quarter of the distance between adjacent pixels and rightward (or leftward) by one-half of the distance between adjacent pixels. In FIG. 4, the solid circle represents the locus of an actual picture element 110 in the image plane and the dashed-line circles 402-1, 402-2, 402-3 and 402-4 represent the four nearest neighbor virtual pixel locations for the particular picture element 110 shown in FIG. 4. In particular, the virtual pixel locations include an upper left pixel location 402-1, an upper right pixel location 402-2, a lower left pixel location 402-3 and a lower right pixel location 402-4. (It is to be understood that the virtual pixel locations are referred to as "upper left", "upper right", "lower left" and "lower right" relative to the location of the particular picture element for which they are nearest neighbors, and not relative to the image plane as a whole.)

Referring once more to FIG. 2, during operation of the display apparatus 100, input image data is received (as indicated at 204) at the input data frame buffer 104 (FIG. 1) from the image data source 102. To implement the image position shift indicated at 202, the control circuit 116 controls the interpolation unit 106 to perform suitable interpolation (block 206 in FIG. 2) of the input image data stored in the input data frame buffer 104. One example of the interpolation performed at 206 in FIG. 2 is illustrated by the flow chart shown in FIG. 5.

Figure 5:
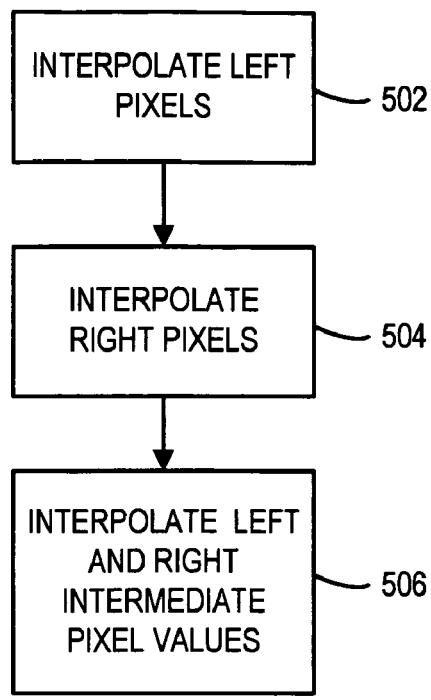
FIG. 5 is a flow chart that illustrates one type of interpolation process that may be performed by the display apparatus of FIG. 1.

At 502 in FIG. 5, the pixel value for the upper left pixel location 402-1 and the pixel value for the lower left pixel location 402-3 are interpolated to generate a left-hand intermediate pixel value which effectively corresponds to a notional pixel location indicated by the dash-double-dot circle 404-1. This interpolation may, for example, take the form of a weighted average of the pixel values for the locations 402-1, 402-3, with the respective weights being based on the location of the actual picture element 110 in the square "cell" 406 defined by the virtual pixel locations 402 (i.e., being based on the vertical displacement of location 110 relative to the locations 402-1, 402-3). In the example illustrated in FIG. 4, since the actual picture element 110 is located three-quarters of the way down in the cell 406, a weight of 0.75 may be applied to the pixel value for the location 402-3 and a weight of 0.25 may be applied to the pixel value for the location 402-1.

At 504, the pixel value for the upper right pixel location 402-2 and the pixel value for the lower right pixel location 402-4 are interpolated to generate a right-hand intermediate pixel value which effectively corresponds to the notional pixel location indicated by the dash-double-dot circle 404-2. In similar manner to 502, this interpolation may also take the form of a weighted average of the pixel values for the locations 402-2, 402-4, with weighting dependent on the location of the actual picture element 110 in the cell 406. Once again, in the example shown, a weight of 0.75 may be applied to the pixel value for the location 402-4 and a weight of 0.25 may be applied to the pixel value for the location 402-2.

At 506, the left-hand intermediate pixel value and the right-hand intermediate pixel value are interpolated to generate the output pixel value (i.e., the pixel value to be used to drive the particular picture element 110 shown in FIG. 4). Once more the interpolation may take the form of a weighted average of the left-hand and right-hand intermediate pixel values, with weighting dependent on the location of the actual picture element 110 in the cell 406. In this case the weighting is dependent on the horizontal displacement of the actual picture element 110 relative to the locations 402, and in the particular example shown, since the picture element is half-way across the cell 406, a weight of 0.5 may be applied to each of the left-hand and right-hand intermediate pixel values.

Figure 6:
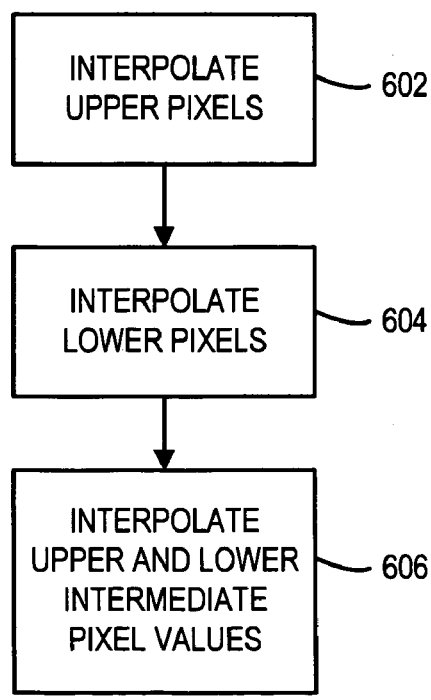
FIG. 6 is a flow chart that illustrates another type of interpolation process that may be performed by the display apparatus of FIG. 1.

Another example of the interpolation that may be performed at 206 (FIG. 2) is illustrated by the flow chart shown in FIG. 6.

At 602 in FIG. 6, the pixel value for the upper left pixel location 402-1 and the pixel value for the upper right pixel location 402-2 are interpolated to generate an upper-side intermediate pixel value which effectively corresponds to a notional pixel location indicated by the dash-double-dot circle 404-3. As before, the interpolation may take the form of a weighted average of the pixel values for the locations 402-1, 402-2, with the respective weights being based on the location of the actual picture element 110 in the cell 406 (i.e., in this case based on horizontal displacement of picture element 110 relative to the locations 402). In the example shown in FIG. 4, since the picture element 110 is half-way across the cell 406, a weight of 0.5 may be applied to each of the pixel values for the locations 402-1, 402-2.

At 604 in FIG. 6, the pixel value for the lower left pixel location 402-3 and the pixel value for the lower right pixel location 402-4 are interpolated to generate a lower-side intermediate pixel value which effectively corresponds to a notional pixel location indicated by the dash-double-dot circle 404-4. Once more the interpolation may be a weighted averaging of the two pixel values in question, and again the weight applied to each pixel value is 0.5 for the example illustrated in FIG. 4.

At 606, the upper-side intermediate pixel value and the lower-side intermediate pixel value are interpolated to generate the output pixel value. Again the interpolation may be a weighted averaging of the intermediate pixel values, and in the example illustrated in FIG. 6, the weights to be applied to the intermediate pixel values are dependent of the vertical displacement of the actual picture element 110 relative to the locations 402. In the specific example shown in FIG. 4, since the actual picture element is three-quarters of the way down in the cell 406, a weight of 0.75 is applied to the lower-side intermediate pixel value and a weight of 0.25 is applied to the upper-side intermediate pixel value.

Figure 7:
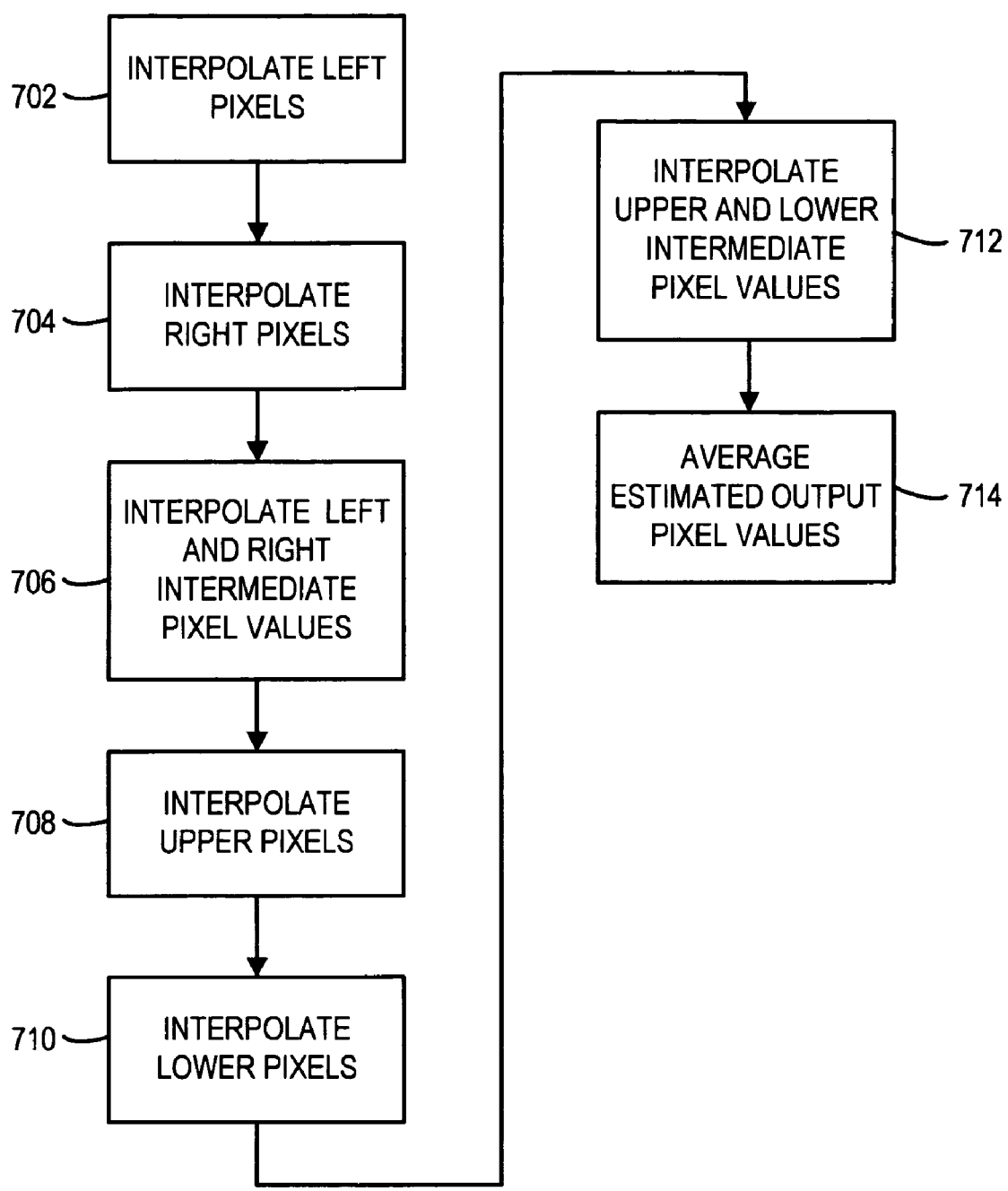
FIG. 7 is a flow chart that illustrates still another type of interpolation process that may be performed by the display apparatus of FIG. 1.

Still another example of the interpolation that may be performed at 206 in FIG. 2 is illustrated by the flow chart shown in FIG. 7.

The interpolation indicated at 702 in FIG. 7 may be the same as that indicated at 502 in FIG. 5. That is, the pixel values for the upper left and lower left locations 402-1, 402-3 may be interpolated to generate a left-hand intermediate pixel value.

The interpolation indicated at 704 in FIG. 7 may be the same as that indicated at 504 in FIG. 5. Thus, the pixel values for the upper right and lower right locations 402-2, 402-4 may be interpolated to generate a right-hand intermediate pixel value.

Then, at 706, the left-hand and right-hand intermediate pixel values are interpolated, as in 506 of FIG. 5, except that the resulting pixel value produced in 706 is only considered to be an estimated output pixel value.

The interpolation indicated at 708 in FIG. 7 may be the same as that indicated at 602 in FIG. 6. That is, the pixel values for the upper left and upper right locations 402-1, 402-2 may be interpolated to generate an upper-side intermediate pixel value.

The interpolation indicated at 710 in FIG. 7 may be the same as that indicated at 604 in FIG. 6. Thus, the pixel values for the lower left and lower right locations 402-3, 402-4 may be interpolated to generate a lower-side intermediate pixel value.

Then, at 712, the upper-side and lower-side intermediate pixel values are interpolated, as in 606 of FIG. 6, but the resulting pixel value produced in 712 is only considered to be an estimated output pixel value.

Next, at 714, the estimated output pixel values produced at 706 and 712 may be averaged (e.g., the arithmetic mean of the two estimated output pixel values may be taken) to generate the output pixel value that will be used to drive the picture element 110 shown in FIG. 4.

It is to be understood that at least one of the interpolation processes discussed above in connection with FIGS. 4-7 may be applied to generate the respective pixel values for each picture element 110 in the array of picture elements of the display apparatus 100. The resulting output pixel values may be stored as interpolated image data in the interpolated data frame buffer 108 (FIG. 1), and, as indicated at 208 in FIG. 2, may be displayed via the pixel drivers 112, the picture elements 110 and the projector 114 (if present). As a result, the image displayed by the display apparatus 100 may be shifted by a sub-pixel increment, in one or both of the horizontal and vertical directions, in accordance with input provided by the user to indicate such a shift.

Thus there has been described a mechanism and processes to allow for user-initiated sub-pixel image position adjustments in projection televisions or other display apparatuses that utilize LCOS or DLP picture element arrays. Such a feature may make the display apparatuses more attractive to users thereof.

In a case where no sub-pixel image shift is requested, data may be read directly from the input data frame buffer 104 (FIG. 1) to the pixel drivers 112, as indicated by dashed-line arrow 120. Where a desired shift in image position is in an increment of an integer number of pixels in both vertical and horizontal directions, data may be read out from the input data frame buffer 104 in a suitable manner to implement the integer-pixel shift. For picture elements that are left "in the dark" by a desired shift, neighboring pixel values may be duplicated or the pixels may be left dark. In some embodiments, a housing bezel (not shown) may be permanently positioned to obscure one or more bottom and/or top lines and one or more left-hand and/or right-hand columns to cover-up artifacts that may be caused at the edge of the image plane by image shifts. In some embodiments, if there is no shift or only an integer-pixel shift in the image position, the interpolation unit 106 may merely pass the image data from the buffer 104 to the buffer 108 without interpolating the image data. In the case of an integer pixel shift, the interpolation unit 106 may cause the input image data to be stored in a shifted position in the frame buffer 108 without interpolating the input image data.

The particular order in which process stages are illustrated and described herein should not be construed to imply a fixed order for performing the processes. Rather the processes and any stages thereof may be performed in any order that is practicable.

Figure 8:
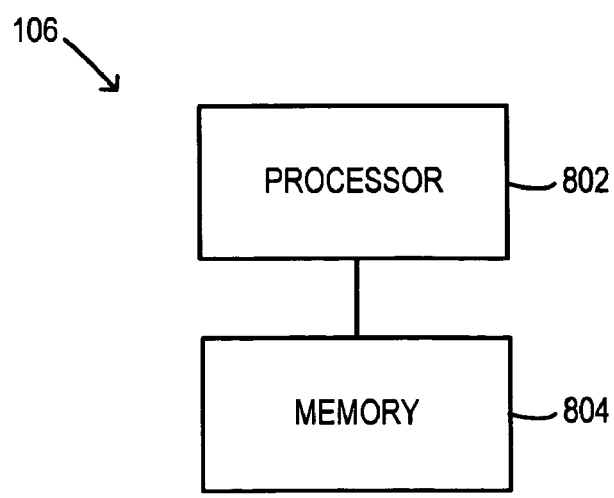
FIG. 8 is a block diagram that shows some details of an interpolation unit provided in accordance with some embodiments as a part of the display apparatus of FIG. 1.

In some embodiments, the interpolation unit 106 may be constituted by application specific integrated circuitry (not separately shown). In other embodiments, such as the one illustrated in FIG. 8, the interpolation unit 106 may be constituted by a general purpose processor 802 or other programmable processor, coupled to a memory 804 that serves as working memory and/or stores software instructions to control the processor 802. A similar configuration to that shown in FIG. 8 may be characteristic of the control circuit 116. The control circuit 116 and the interpolation unit 106 may share working and/or program memory and/or may both be implemented by suitable software instructions controlling a single shared processor. The software instructions may embody some or all of the processes described herein.

The interpolation indicated at 206 in FIG. 2 may be performed in other ways besides those described above. For example, as an alternative to the multi-step interpolations described with reference to FIGS. 4-7, a single-step interpolation may be performed with respect to the four pixel values which correspond to the locations 402 in FIG. 4.

In some embodiments, the user interface 118 (FIG. 1) includes a remote control unit (not separately shown) with conventional "direction" keys (e.g., up, down, left, right) and/or other keys by which a menu may be invoked and/or menu items may be selected. A menu may contain an item to invoke a display (not shown) to allow entry of user input concerning repositioning of the image in the image plane. The display may, e.g., resemble FIG. 4, with locations 404 omitted, and with locations 402 representing the fixed locations of picture elements in the image plane. The element indicated by 110 in FIG. 4 may, in the display now being discussed, be moved in response to user input (e.g., actuation of arrow keys) to indicate a desired sub-pixel shift in the position of the image in the image plane.

In some embodiments the input data frame buffer 104 and the interpolation data frame buffer 108 may be combined in a single memory unit. Whether or not combined, the buffers 104, 108 may be collectively referred to as a "graphics memory unit".

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
    providing a display device, the display device including a plurality of picture elements and a plurality of pixel drivers each for driving a respective one of the picture elements;
    receiving input image data to drive the picture elements to display an image in an image plane;
    receiving user input to indicate a shift in position of said image in said image plane, said shift in position by less than a distance between adjacent ones of said picture elements;
    in response to said received user input, processing said received input image data to generate interpolated image data to implement said shift in position; and
    driving said picture elements with said interpolated image data.

2. The method of claim 1, wherein said processing includes calculating from four input pixel values an output pixel value for driving one of said picture elements, each of said four input pixel values included in said received input image data and each corresponding to a respective one of four pixel locations, said four pixel locations including an upper left pixel location, an upper right pixel location, a lower left pixel location and a lower right pixel location.

3. The method of claim 2, wherein said processing includes:
interpolating respective input pixel values for said upper left pixel location and said lower left pixel location to generate a left-hand intermediate pixel value;
interpolating respective input pixel values for said upper right pixel location and said lower right pixel location to generate a right-hand intermediate pixel value; and
interpolating the left-hand intermediate pixel value and the right-hand intermediate pixel value to generate said output pixel value.

4. The method of claim 2, wherein said processing includes:
interpolating respective input pixel values for said upper left pixel location and said upper right pixel location to generate an upper-side intermediate pixel value;
interpolating respective input pixel values for said lower left pixel location and said lower right pixel location to generate a lower-side intermediate pixel value; and
interpolating the upper-side intermediate pixel value and the lower-side intermediate pixel value to generate said output pixel value.

5. The method of claim 2, wherein said processing includes:
interpolating respective input pixel values for said upper left pixel location and said lower left pixel location to generate a left-hand intermediate pixel value;
interpolating respective input pixel values for said upper right pixel location and said lower right pixel location to generate a right-hand intermediate pixel value;
interpolating the left-hand intermediate pixel value and the right-hand intermediate pixel value to generate a first estimated output pixel value;
interpolating respective input pixel values for said upper left pixel location and said upper right pixel location to generate an upper-side intermediate pixel value;
interpolating respective input pixel values for said lower left pixel location and said lower right pixel location to generate a lower-side intermediate pixel value;
interpolating the upper-side intermediate pixel value and the lower-side intermediate pixel value to generate a second estimated output pixel value; and
averaging said first and second estimated output pixel values to generate said output pixel value.

6. The method of claim 1, further comprising:
storing the input image data in a first frame buffer; and
storing the interpolated image data in a second frame buffer that is different from the first frame buffer.

7. The method of claim 1, wherein said picture elements are either liquid-crystal-on-silicon (LCOS) or digital light processor (DLP) picture elements.

8. An apparatus comprising:
a graphics memory unit to store input image data;
an interpolation unit coupled to the graphics memory unit to process the input image data to generate interpolated image data, the graphics memory unit to store the interpolated image data;
a plurality of picture elements;
a plurality of pixel drivers each for driving a respective one of the picture elements in accordance with a respective pixel value from said interpolated image data so that an image is displayed in an image plane, said pixel drivers each coupled to said respective one of the picture elements and coupled to the graphics memory unit;
a user interface to receive user input to indicate a shift in position of said image in said image plane, said shift in position by less than a distance between adjacent ones of said picture elements; and
a control circuit coupled to said user interface and to said interpolation unit to cause said interpolation unit to generate said interpolated image data to implement said shift in position.

9. The apparatus of claim 8, wherein said interpolation unit calculates from four input pixel values an output pixel value for driving one of said picture elements, each of said four input pixel values included in said received input image data and each corresponding to a respective one of four pixel locations, said four pixel locations including an upper left pixel location, an upper right pixel location, a lower left pixel location and a lower right pixel location.

10. The apparatus of claim 9, wherein said interpolation unit:
interpolates respective input pixel values for said upper left pixel location and said lower left pixel location to generate a left-hand intermediate pixel value;
interpolates respective input pixel values for said upper right pixel location and said lower right pixel location to generate a right-hand intermediate pixel value; and
interpolates the left-hand intermediate pixel value and the right-hand intermediate pixel value to generate said output pixel value.

11. The apparatus of claim 9, wherein said interpolation unit:
interpolates respective input pixel values for said upper left pixel location and said upper right pixel location to generate an upper-side intermediate pixel value;
interpolates respective input pixel values for said lower left pixel location and said lower right pixel location to generate a lower-side intermediate pixel value; and
interpolates the upper-side intermediate pixel value and the lower-side intermediate pixel value to generate said output pixel value.

12. The apparatus of claim 9, wherein said interpolation unit:
interpolates respective input pixel values for said upper left pixel location and said lower left pixel location to generate a left-hand intermediate pixel value;
interpolates respective input pixel values for said upper right pixel location and said lower right pixel location to generate a right-hand intermediate pixel value;
interpolates the left-hand intermediate pixel value and the right-hand intermediate pixel value to generate a first estimated output pixel value;
interpolates respective input pixel values for said upper left pixel location and said upper right pixel location to generate an upper-side intermediate pixel value;
interpolates respective input pixel values for said lower left pixel location and said lower right pixel location to generate a lower-side intermediate pixel value;
interpolates the upper-side intermediate pixel value and the lower-side intermediate pixel value to generate a second estimated output pixel value; and
averages said first and second estimated output pixel values to generate said output pixel value.

13. The apparatus of claim 8, wherein said picture elements are either liquid-crystal-on-silicon (LCOS) or digital light processor (DLP) picture elements.

14. An apparatus comprising:
a storage medium having stored thereon instructions that when executed by a machine result in the following:
receiving input image data to drive picture elements to display an image in an image plane;

receiving user input to indicate a shift in position of said image in said image plane, said shift in position by less than a distance between adjacent ones of said picture elements;

in response to said received user input, processing said received input image data to generate interpolated image data to implement said shift in position; and driving said picture elements with said interpolated image data.

15. The apparatus of claim 14, wherein said processing includes calculating from four input pixel values an output pixel value for driving one of said picture elements, each of said four input pixel values included in said received input image data and each corresponding to a respective one of four pixel locations, said four pixel locations including an upper left pixel location, an upper right pixel location, a lower left pixel location and a lower right pixel location.

16. The apparatus of claim 15, wherein said processing includes:

interpolating respective input pixel values for said upper left pixel location and said lower left pixel location to generate a left-hand intermediate pixel value;

interpolating respective input pixel values for said upper right pixel location and said lower right pixel location to generate a right-hand intermediate pixel value; and interpolating the left-hand intermediate pixel value and the right-hand intermediate pixel value to generate said output pixel value.

17. The apparatus of claim 15, wherein said processing includes:

interpolating respective input pixel values for said upper left pixel location and said upper right pixel location to generate an upper-side intermediate pixel value;

interpolating respective input pixel values for said lower left pixel location and said lower right pixel location to generate a lower-side intermediate pixel value; and interpolating the upper-side intermediate pixel value and the lower-side intermediate pixel value to generate said output pixel value.

18. The apparatus of claim 15, wherein said processing includes:

interpolating respective input pixel values for said upper left pixel location and said lower left pixel location to generate a left-hand intermediate pixel value;

interpolating respective input pixel values for said upper right pixel location and said lower right pixel location to generate a right-hand intermediate pixel value;

interpolating the left-hand intermediate pixel value and the right-hand intermediate pixel value to generate a first estimated output pixel value;

interpolating respective input pixel values for said upper left pixel location and said upper right pixel location to generate an upper-side intermediate pixel value;

interpolating respective input pixel values for said lower left pixel location and said lower right pixel location to generate a lower-side intermediate pixel value;

interpolating the upper-side intermediate pixel value and the lower-side intermediate pixel value to generate a second estimated output pixel value; and averaging said first and second estimated output pixel values to generate said output pixel value.

* * * * *